(12) United States Patent
Kirshenboim et al.

(10) Patent No.: US 9,607,290 B2
(45) Date of Patent: Mar. 28, 2017

(54) APPARATUS AND METHOD FOR DETECTING MESSAGES IN A PARSING PROCESS

(75) Inventors: Amir Kirshenboim, Tel Aviv (IL); Idan Meir, Tel Aviv (IL); David Rabinowitz, Ramat Gan (IL); Eli Ben Yakar, Kfar Daniel (IL); Nadav Gur, Palo Alto, CA (US)

(73) Assignee: WORLDMATE, LTD., Lod (IL)

( * ) Notice: Subject to any disclaimer, the term of this patent is extended or adjusted under 35 U.S.C. 154(b) by 670 days.

(21) Appl. No.: 12/852,488

(22) Filed: Aug. 8, 2010

(65) Prior Publication Data

US 2011/0239160 A1    Sep. 29, 2011

Related U.S. Application Data

(60) Provisional application No. 61/316,847, filed on Mar. 24, 2010.

(51) Int. Cl.
   *G06Q 10/10* (2012.01)
   *G06Q 10/02* (2012.01)

(52) U.S. Cl.
   CPC .......... *G06Q 10/107* (2013.01); *G06Q 10/02* (2013.01)

(58) Field of Classification Search
   USPC .................................. 715/810, 752; 705/5, 6
   See application file for complete search history.

(56) References Cited

U.S. PATENT DOCUMENTS

| | | | |
|---|---|---|---|
| 2002/0174185 A1* | 11/2002 | Rawat et al. | 709/206 |
| 2004/0044674 A1* | 3/2004 | Mohammadioun et al. | 707/100 |
| 2005/0204011 A1* | 9/2005 | Velayudham | 709/206 |
| 2005/0216824 A1 | 9/2005 | Ferguson et al. | |
| 2007/0016897 A1* | 1/2007 | Todd | 717/143 |
| 2007/0083602 A1* | 4/2007 | Heggenhougen | H04L 12/583 709/206 |
| 2007/0130463 A1 | 6/2007 | Law et al. | |
| 2007/0220271 A1 | 9/2007 | Law | |
| 2007/0226754 A1* | 9/2007 | Grabarnik et al. | 719/313 |
| 2007/0239494 A1 | 10/2007 | Stephens et al. | |
| 2007/0244793 A1 | 10/2007 | Boesel | |
| 2008/0196016 A1* | 8/2008 | Todd | 717/143 |
| 2008/0222246 A1* | 9/2008 | Ebling et al. | 709/203 |
| 2009/0012824 A1* | 1/2009 | Brockway et al. | 705/6 |
| 2009/0100367 A1* | 4/2009 | Dargahi et al. | 715/769 |
| 2009/0210262 A1* | 8/2009 | Rines et al. | 705/5 |
| 2009/0234844 A1* | 9/2009 | Kaehler et al. | 707/5 |

(Continued)

OTHER PUBLICATIONS

Final Office Action for U.S. Appl. No. 12/853,309, mailed Jan. 31, 2013, 7 pages.

(Continued)

*Primary Examiner* — Christopher J Fibbi
(74) *Attorney, Agent, or Firm* — Foley & Lardner LLP

(57) ABSTRACT

The subject matter discloses a method of handling messages received to an email client of a computerized device, the method comprises detecting the received message, said message is generated by a machine in a structured format; identifying the detected message to be conformant to a structured template related to a computerized application; generating a response upon identifying the message. In some cases, the rules are generated by a server connected to a plurality of computerized devices to create efficient and fast rules and templates.

11 Claims, 5 Drawing Sheets

(56) References Cited

U.S. PATENT DOCUMENTS

2012/0042024 A1    2/2012  Kirshenboim
2012/0042371 A1    2/2012  Gur et al.
2012/0330906 A1*  12/2012  Fredericks ............. G06Q 10/02
                                                                                707/692

OTHER PUBLICATIONS

Non-Final Office Action for U.S. Appl. No. 12/853,309, mailed Aug. 29, 2012, 6 pages.
Non-Final Office Action for U.S. Appl. No. 13/207,440, mailed Mar. 11, 2013, 11 pages.

* cited by examiner

APPARATUS AND METHOD FOR DETECTING MESSAGES IN A PARSING PROCESS

BACKGROUND OF THE INVENTION

Field of the Invention

The present invention relates to parsing processes of messages in general and to detecting important messages in a parsing processes in particular.

Discussion of the Related Art

In many known computerized applications, the user receives messages from computerized systems that send structured messages. The structured messages contain structured information and data fields sent in a specific template.

When a user of a computerized device receives the structured message, the user has to determine whether the message is conformant to a specific application, for example a traveling application, entertainment, banking and the like. Then, the user sends the message to an application server managed by the application, located externally to the user's mobile device. The application server extracts information from the messages, provides reminders and other analysis according to the messages forwarded by the user.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

SUMMARY OF THE INVENTION

Figure 1:
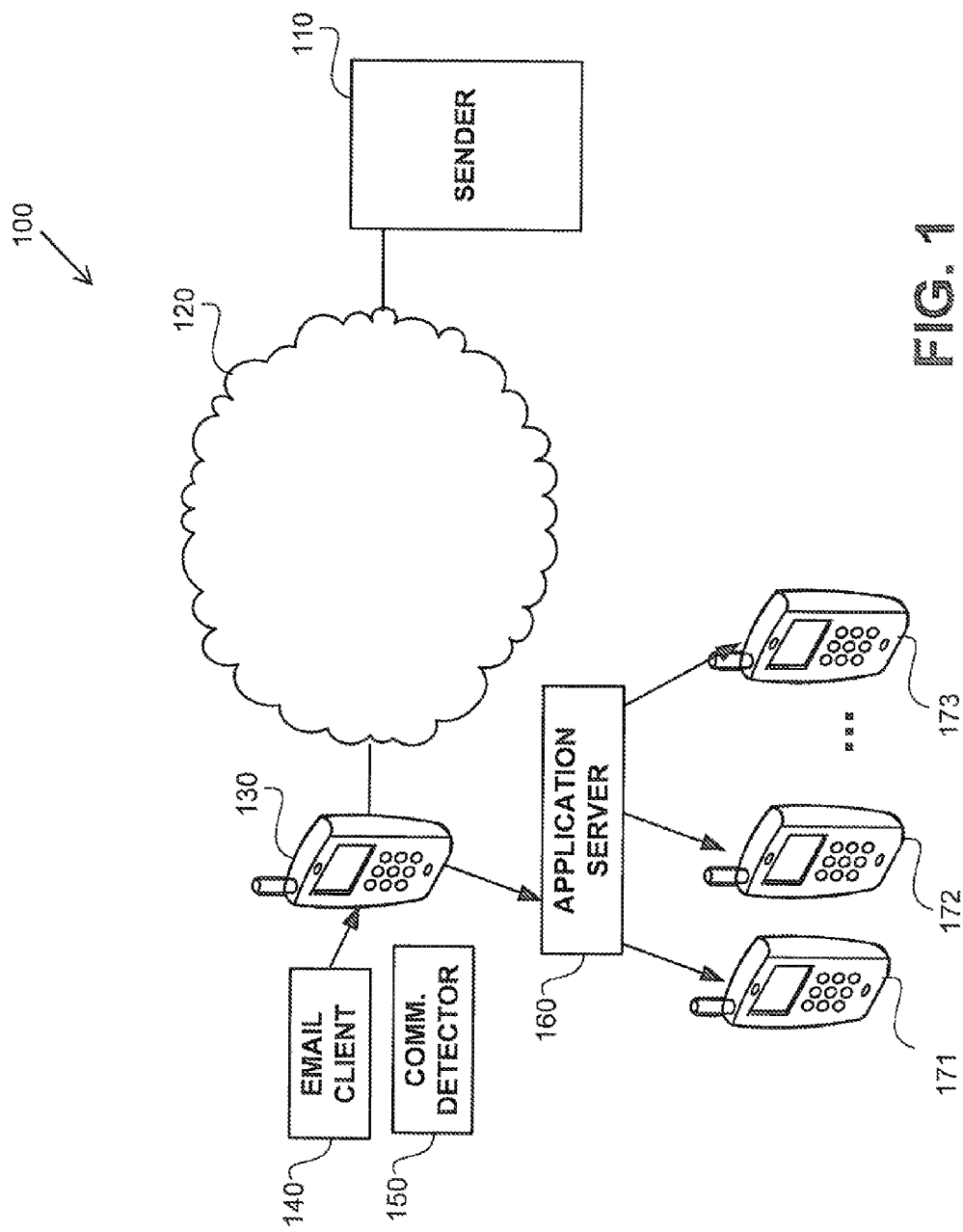
FIG. 1 shows a computerized environment for detecting messages in a user's device, according to exemplary embodiments of the subject matter.

It is an object of the subject matter to disclose a method of handling messages received to an email client of a computerized device, the method comprises, detecting the received message, said message is generated by a machine in a structured format; identifying the detected message to be conformant to a structured template related to a computerized application; generating a response upon identifying the message.

In some embodiments, the response comprises a step of automatically forwarding the identified message. In some embodiments, the response comprises a step of providing a menu to the user, said menu comprises an option to forward the message.

In some embodiments, the step of detection is performed on an email client in the user's device. In some embodiments, the step of detection is performed on an email server. In some embodiments, the step of detection is performed on a proxy email server.

In some embodiments, the method further comprises a step of classifying the detected message with a specific template related to the computerized application.

In some embodiments, the computerized application is a web application. In some embodiments, the computerized application is connected to the computerized device. In some embodiments, the computerized device is one of two or more computerized devices connected to a server, said server generates rules according to messages received at the server, and the computerized device applied the rules generated by the server in identifying that the detected message is conformant to a computerized application.

In some embodiments, the application handles travel information for a user of the computerized device.

It is another object of the subject matter to disclose a computer program product comprising: a computer readable medium; a first program instruction for detecting the received message; a second program instruction identifying the detected message to be related to a computerized application connected to the mobile device; a third program instruction for generating a response upon identifying the message.

It is another object of the subject matter to disclose a system for handling a message related to an application operating on a mobile device, the system comprises a receiver for detecting that a message is received; a processor for determining the conformance of the received message to the application operating on a mobile device; wherein the processor further determines the response upon determining that the received message is conformant to the application operating on a mobile device.

In some embodiments, the system further comprises an interface module for providing a menu to the user, said menu comprises an option to forward the message.

In some embodiments, the system further comprises a transmitter for automatically transmitting the message to the application.

It is another object of the subject matter to disclose method for communicating with two or more computerized devices, comprising: receiving messages received in the two or more computerized devices, the received messages are generated by a computer; generating a first rule for identifying messages as conformant with a message template, conformance of a message with a message template allows data extraction from the message and sending a second rule derived from the first rule to the two or more computerized devices.

In some embodiments, the server identifies the message templates with which the received messages conform and creates rules for detecting such templates.

DETAILED DESCRIPTION OF THE PREFERRED EMBODIMENT

One technical problem addressed in the subject matter is the time consumed by a user receiving a message to determine whether the message is conformant to a specific application installed on a computerized device that receives the message. Another technical problem is the urgency of handling the received mail which is not addressed by the application in case the user is unavailable to send the message to the application.

One technical solution of the disclosed subject matter is a system for detecting messages received at a user's email client. The system detects messages and determines which of the messages relates to a specific application. Such determination may comprise a step of parsing the data within the received message. The system of the subject matter may also detect SMS messages, instant messaging applications' messages and the like. The communication detector may be used to detect messages concerning applications such as sports applications, applications concerning a specific field of business, arts, entertainment, banking alerts, purchasing alerts, travel planning and the like. When identifying a message, the communication detector may generate a pop-up message to the user concerning the application relevant to handling the message. Alternatively, the grabber may suggest a set of rules or settings according to which a message is handled when identified as related to a specific topic, such as traveling. In many cases, the grabber automatically forwards the message to an application server where the application is managed. Such server may be managed externally to the user's device.

FIG. 1 shows a computerized environment for detecting messages in a user's device, according to exemplary embodiments of the subject matter. The computerized environment 100 comprises a sender 110 for sending messages to a receiver's device 130 via a network 120. The sender may be a retail store, a travel agency, a hotel, a bank or another person or entity related to a computerized application. The computerized application may operate on the receiver's device 130 or may be a web application. The receiver's device 130 comprises a communication receiver, such as an email client 140 or another unit for detecting other messages such as SMS, MMS, instant messages and the like. The receiver's device 130 further comprises a communication detector 150, for detecting messages received at the communication receiver. The communication detector 150 comprises a set of rules according to which a detected message is associated with a predetermined field, such as traveling.

The communication detector may comprise a parser unit for parsing at least a portion of the detected message. The message is generated at a computerized engine in a structured form. For example, a hotel has a specific form for sending messages concerning bookings. Such message is generated by a computer, not by a person. Such message contains data in a standard format. For example, price in the second line, address in the fourth line, customer's name in the title and the like. The information in the message is represented in a template characterizing a predefined type of structured message.

Parsing the message is performed in a two-tier process. In the first step of the parsing process, the structured message is identified as a template related to a specific application or to a specific sender. The second step provides for extracting the data from the message according to the template determined in the first step. The second step, of extracting data from the messages, is performed only on messages suspected to be conformant with known templates.

The second step of the parsing may be performed by an adaptive server or by the user's device. The server 160 receives messages from a vast amount of computerized device such as computerized devices 171, 172 and 173. As there may not be prior knowledge when a new template is created or an existing one is changed, the vast amount of messages enables the server 160 to generate rules concerning the templates and how to extract content from the messages. Such vast amount of messages from many users enables relatively quick response from the server 160 for any new or updated message template or formats. As a result, the server 160 that generates the rules may update or generate identification rules in a faster and more effective manner.

The first step in the parsing provides for identifying the conformance of a structured message to a template from which the data can later be extracted in the second step of parsing. The rules generated by the server 160 concerning the template identification are used by the user's device in identifying the conformance of the message to an application, according to a template associated with an application. For example, the server 160 generates a rule according to which, a specific data contains financial data that is to be extracted from a message that relates to a banking application. Such extraction is performed by the banking application. In some cases, a rule derived from the rule generated by the server 160 is sent to the user's device, or to another computerized entity that performs identification of the message during the parsing process. For example, the identifying module that determines the conformance of the message to a specific template determines whether the format of the message matches a template associated with the application. If there is a match, the message may be sent directly to the application server, or a pop-up is displayed to the user to send the message to the application server.

The rules generated by the server 160 are synchronized with the computerized module that performs identification in a frequent manner. This is as opposed to "static rules" defined in a standard email application such as Outlook. Further, the rules provided according to the subject matter in identifying that a message is related to an external application may be associated with rules concerning extraction of content from the message, unlike prior art systems.

When performing identification, the parsing unit may parse only a predetermined field or segment of the detected message, for example the sender field, the subject, the first 100 characters and the like. The set of rules on the user's device 130 may be modified frequently or according to actions made by the user. Such modifications may result from periodic updates mechanism or pushed updates etc received from a unit handling the rules. The rules may include identifying a message as a specific template related to an application in case fields match. For example, in case the title of the message comprises an expression that matches the sender's name. Identification may also include searching for content matching keywords or regular expressions in the fields or the body of the message and the like. Complex rules may use AND, OR and NOT operators applied on basic matching rules.

In case the detected message is determined as associated with a predetermined field, such as traveling, the communication detector may have several response options. The first option is to automatically forward the identified message to an email account related to the field, or to a server 160 related to the application. Such email account may be connected to a travel application that manages travel information, such as WorldMate's commercially available application. The forwarded items may be visible in the user's sent items folder. Another option for responding to identification of the message as related to a predetermined field may be displaying a menu to the user. The menu will inform the user that a received message was identified, and will provide several possible user commands, such as forwarding the message, always forwarding message from the same sender, always forwarding messages detected as related to the application, opening a settings menu for determining settings on a higher resolution and the like. In case the user selects forwarding the message to the application that manages that information, a server may reply with a success or fail email after performing the data extraction.

Figure 2:
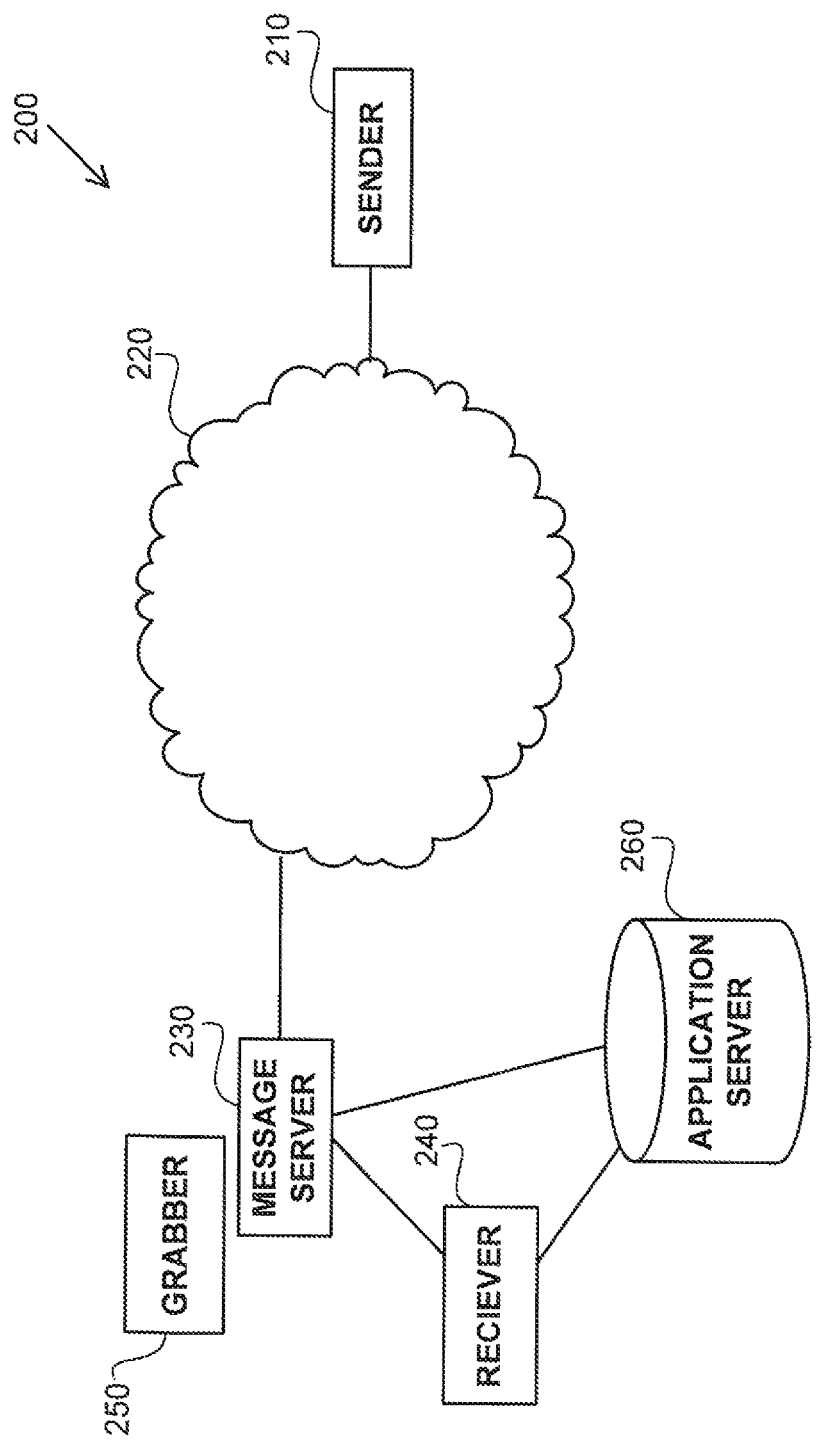
FIG. 2 shows a computerized environment for detecting messages before the messages are received at a user's device, according to exemplary embodiments of the subject matter.

FIG. 2 shows a computerized environment for detecting messages before the messages are received at a user's device, according to exemplary embodiments of the subject matter. The computerized environment 200 comprises a sender 210 for sending messages to a receiver's device 240 via a network 220 and a message server 230. The message server 230 might be an email server like Microsoft's Exchange or IBM's Domino, a middleware server handling emails like the Blackberry Enterprise Server or an email client and any associated plug-in such as Microsoft's Outlook or Xobni, or any composite such as Google's email service. The message server 230 receives the message from the sender 210 and transmits the message to the receiver 240. In the exemplary embodiment of FIG. 2, the communication detector (such as 150 of FIG. 1) may also reside in the message server 230. This configuration provides advanced capabilities, as the message server 230 provides improved power, CPU capabilities and the like. The message server 230 may then provide the user with the options discussed above, or automatically forward the message to the application database 260.

In some other exemplary embodiments of the disclosed subject matter, the detection may be performed after generating a copy of the email account of the user. Such copy may reside in a device desired by the person skilled in the art, for example in the user's mobile device, in the application's server, in a separate email server and the like. In some cases, more than one copy is created. Such copy is desired in mobile devices that do not support detection of email in the mobile device, for example iPhone and Android devices. The copied email account resides in a proxy email server between the email server and the email client and provides a parallel route that is independent from the technology or environment of the user's mobile device or the email server. In case the copied email account resides in the server of the application, the copied email account generates a message and sends the message to the application in the user's mobile device, notifying the application on receipt of a new message that is detected as potentially matching a known template.

The disclosed subject matter also discloses a method for adding information to a detected message, while forwarding both the detected message and the additional information to the database of the application. The method comprises a step of detecting that the message is received, either at the user's device or at a server handling message transmission or pushing email messages. The next step discloses parsing the detected message and identifying that the detected message is related to a predetermined application, such as a travel application, sports and the like. The result of said parsing may also be classifying the message template related to the message. For example, classifying that the message is a confirmation message from a specific retail company. Additional information may comprise specific details about results of parsing processing done in the detection phase, device and message characteristics. The additional information may be sent to the application server alongside the forwarded message.

In some exemplary embodiments of this method, the communication grabber generates an email address comprising the regular email address for the application server and the additional information. For example, in case the standard email address is trips@worldmate.com, the new and generated email address may be 11_Smith_London_trips@worldmate.com The application server is configured to identify that the email message having the new email address will be received at the general email address trips@worldmate.com. Then, the additional information associated with the entity from which the email was sent are extracted. For example, the terms London, Smith and 11 are translated by the application server as valuable data fields. The response from the application that receives the forwarded message may be a function of the parameters appearing in the newly generated email address.

Figure 3:
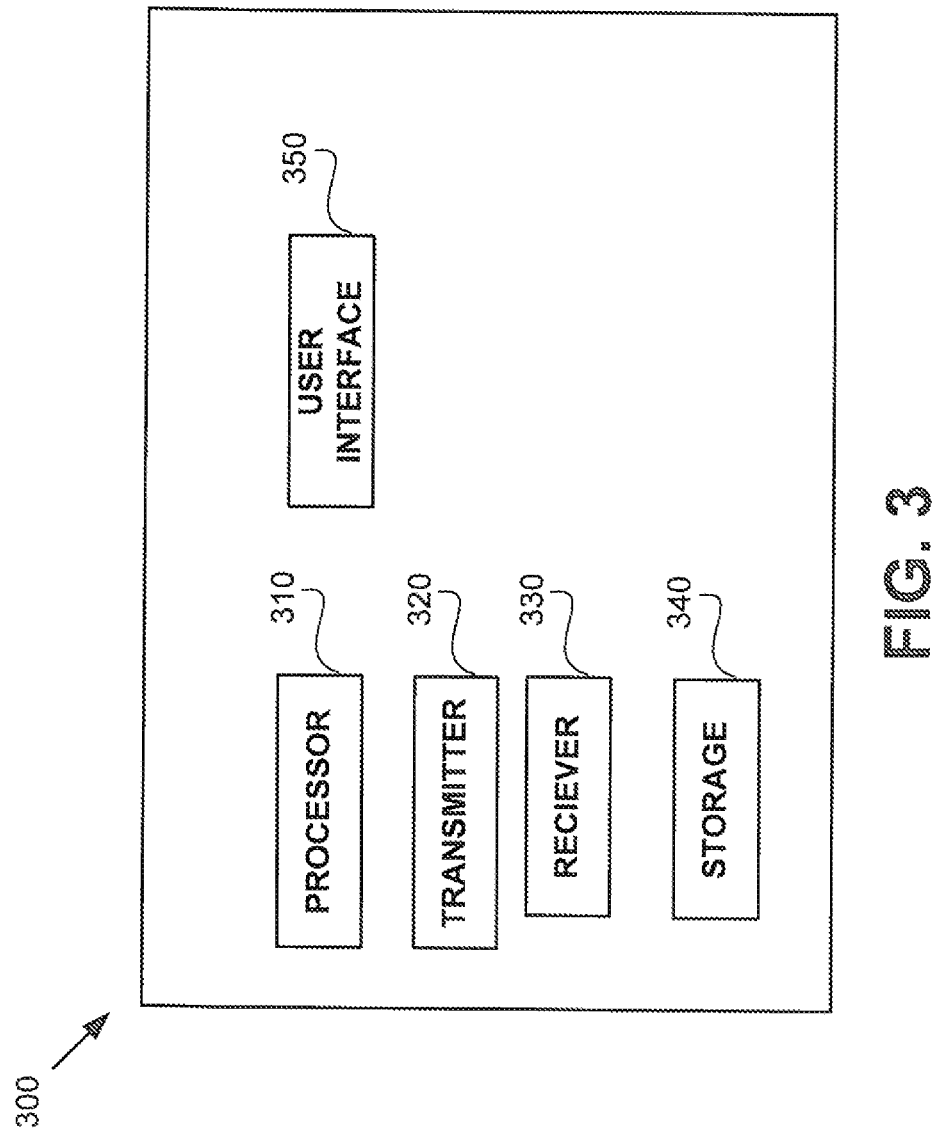
FIG. 3 shows a system for detecting messages at a user's device, according to exemplary embodiments of the subject matter.

FIG. 3 shows a system for detecting messages, according to exemplary embodiments of the disclosed subject matter. The system 300 may reside in the user's mobile device, in a personal computer used by the user, in a message server as disclosed in FIG. 2, and the like.

The system 300 comprises a receiver 330. The receiver 330 receives an indication that a new message is received at the message account of the user, for example an incoming SMS or email. The receiver 330 may listen to the email account of the user's device or to the email server. The receiver may be implemented in a copy of the message account stored in the application server or in the user's computerized device. Upon detecting a new message to the user, the receiver 330 notifies a processor 310 of the system 300 that a message has been received.

The processor 310 receives the message from the receiver 330 or retrieves the message from the message server. The processor 310 may parse the received message and determine the conformance of data fields within the received message to the user's travel. Such data fields may be the message sender, header, title and the message body The processor 310 may be connected to a storage unit 340 that contains rules concerning identifying that a message is related to a specific application. In some exemplary cases, the storage unit 340 stores rules that are received from a server that may also extract data from the messages that relate to applications. Such rules received from the server concern identification and classification of messages according to templates that the application server can extract content from. The rules may also be sent from an application server such as 160 of FIG. 1. The application server 160 is connected to a vast amount of user's devices for efficient generation and update of detection rules. Such rule is sent to the storage unit 340 and used by the processor 310 in determining the conformance of the message to a specific application or template. In some cases, each server generates content classification and extraction rules for a specific application. The processor 310 may also compare the data fields of the received message with data fields stored in a storage unit 340. The processor 310 may determine to automatically send the detected message to a server or email account connected to the application, or to the application itself, located inside the user's mobile device. Such automatic forwarding verifies that all messages conformant to a set of message templates are stored and handled by the application without requiring any effort from the user.

The storage unit 340 may also contain rules concerning steps performed by the processor 310. For example, in case the processor 310 receives a notification that a new message has been received, the message contains the term "train" in the body, not in the subject, the storage unit 340 contains a rule applied by the processor 310 as to how the detected message should be handled. The processor 310 may also review a list of rules or conditions in the storage unit 340 and compare the list of rules or conditions to the detected message, for example the time in which the message has been received, domain name of a message sender and the like.

The system 300 may also comprise a transmitter 320 for transmitting messages to an entity external to the system 300. The transmitter 320 may send a message to an application residing on the user's mobile device that a conformant message has been detected by the system 300. The transmitter 320 may alternatively send messages from a remote location such as an email server when the system 300 is located externally to the user's mobile device. The transmitter 320 may also send statistics related to incoming messages at the user's email account, such that the set of rules in the storage unit 340 may be updated frequently according to analysis performed by the processor 310 or by the application database.

The system 300 may further comprise a user interface module 350. The user interface module 350 provides the user with menus and settings concerning ways to handle incoming messages related to traveling. For example, when detecting three emails from a specific travel supplier, the user interface module 350 may provide the user with an option to automatically forward any new incoming email messages from the same domain. The user interface module 350 may suggest the user to forward the detected message solely, or according to a rule defined by the user or according to a rule stored in the storage unit 340.

Figure 4:
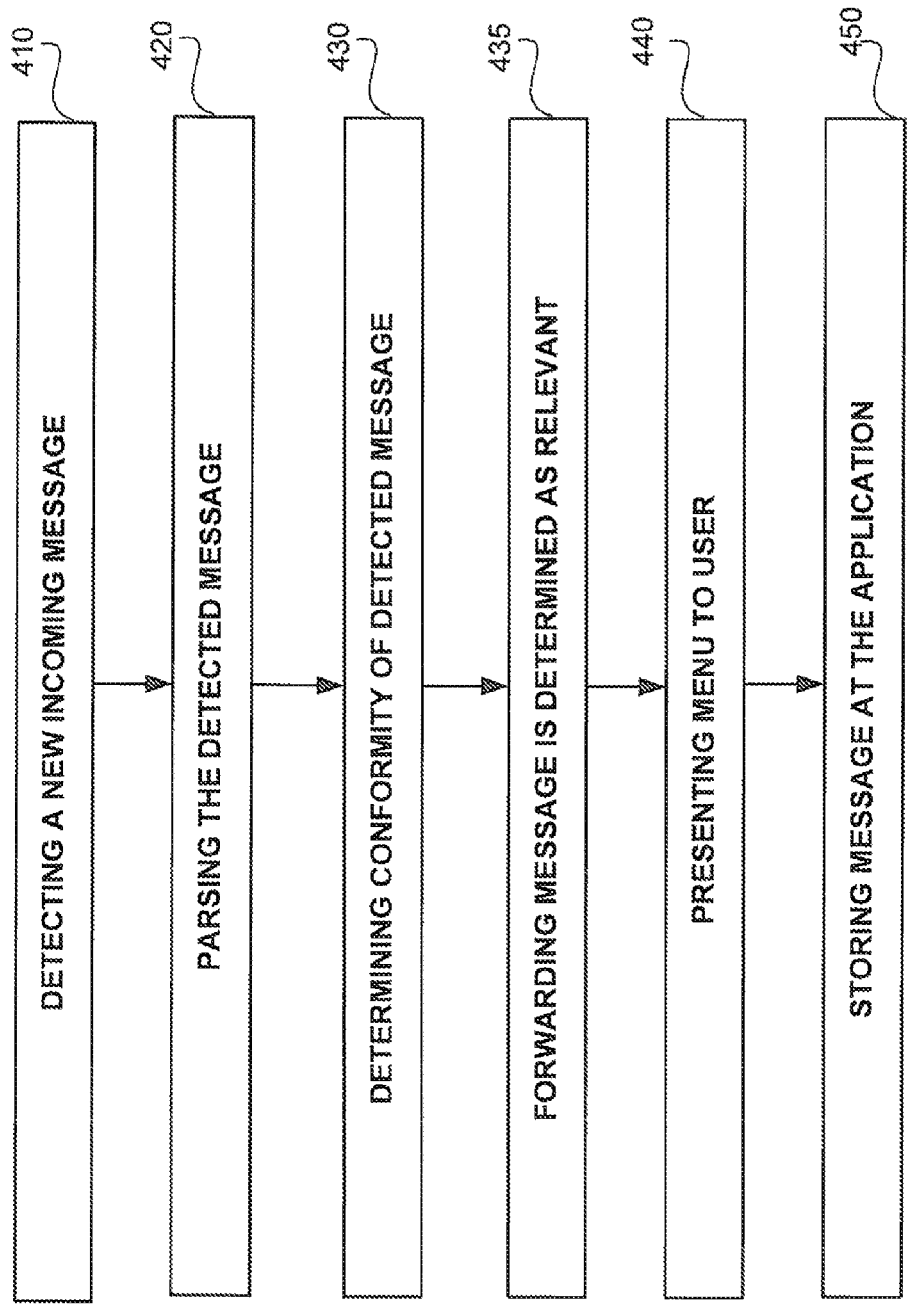
FIG. 4 shows a method for handling messages received at a user's device, according to exemplary embodiments of the subject matter; and, FIG. 5 shows a method for analyzing messages received at a user's device, according to exemplary embodiments of the subject matter.

FIG. 4 shows a method for handling messages received at a user's device, according to exemplary embodiments of the subject matter. In step 410, the system detects that a new message has been received at the message account of the user. Such detection may be performed on the user's mobile device, on the message server in which the message account is handled, on a copy of the email account generated by the system in case direct access to the account is unavailable and the like. In step 420, the detected message is parsed. Such parsing may be performed in the application handling travel information or at the entity in which the email is detected.

In step 430, the message is analyzed to determine the conformance of the message to application-specific information and actions. An exemplary embodiment of such analysis is described in greater details in FIG. 5. The analysis may be based on the parsed content and a set of rules and conditions. The parsed content may include the email domain from which the message was sent, content of the title, content of the message, date and time in the message and the like.

In step 435, in case the detected message is conformant to an application template, the message is forwarded to the application server in an automatic manner. In such case, the application server may include an email client for handling the incoming messages that are determined to be conformant on step 430.

In step 440, a menu is presented to the user of the mobile device. The menu enables the user to determine automatic settings or semi-automatic settings. For example, the menu contains the option to automatically forward every email from a specific domain, or to raise the option to forward every message containing a predefined term, such as London, or a combination of the terms "flight" and "London". The menu may allow the user to touch the desired option. In some cases, the rule suggested to the user is to allow the system to automatically send every message determined as conformant to an application.

In step 450, the message is stored in the application server.

Figure 5:
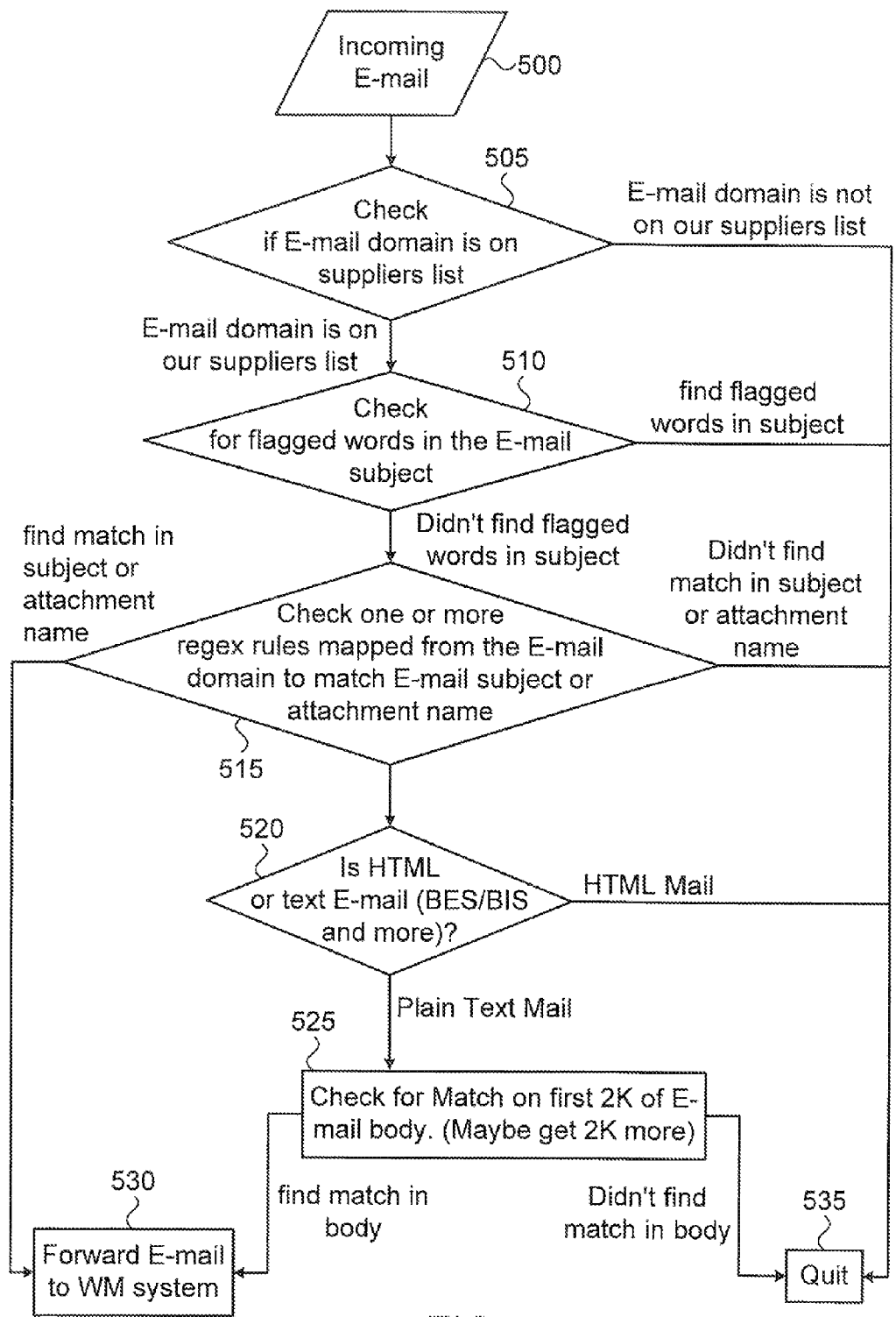

FIG. 5 shows a method for analyzing messages received at a user's device, according to exemplary embodiments of the subject matter. In step 500, the message is received at the message account, such as an email account. In step 505, the processor determines whether the domain from which the message has been sent is included in a list stored in a storage unit. The list may include registered suppliers. If the domain is not included in the list, the message is determined as non-conformant. If the domain is included in the list, the next step is step 510, in which the processor determines whether the message contains predefined words or expressions that render the message non-conformant. If such words or expressions are not included in the received message, the next step is step 515, in which the processor determines whether the attachment name or subject of the message match regular expressions related to the domain name of the message. If there is a match, the message is determined as conformant to traveling. If there is no match, and the message is non-HTML message, the processor determines whether there is a match in a portion of the message. If there is a match, the message is determined as conformant to traveling. In case the message is determined as conformant, it may be automatically sent to the application or to the application database, or can be displayed to the user with the option to send it to the application for further analysis.

When examining the received message, one step is Check one or more regular expression rules mapped from the email domain match email subject or attachment name. If the match is found, the message is forwarded to the application's system. If match is not found, the message will be forwarded in case the message contains plain text, and a match was found in the body of the message.

Employment of the automatic detection methods described significantly increases usage of the system. In a controlled test in the travel domain, the number of messages forwarded per user has increased by 182% when the automated process was implemented, resulting in a 155% growth in the number of travel itineraries created per user and a further increase in the number of items per itinerary.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A computerized method for handling travel confirmation e-mails, the method comprising:
    sending, from a travel itinerary application of a remote server to a user device, template mapping data comprising a set of a plurality of travel itinerary suppliers and at least one structured confirmation e-mail template corresponding to each of the plurality of travel itinerary suppliers, wherein each structured confirmation e-mail template characterizes a standard format in which travel confirmation e-mails are provided by the corresponding travel itinerary supplier;
    receiving, at the user device having an e-mail client, the template mapping data from the remote server including the set of travel itinerary suppliers and the structured confirmation e-mail templates, wherein the user device, the remote server and each of the plurality of travel itinerary suppliers are separate devices;

storing, at the user device, the template mapping data including the set of travel itinerary suppliers and the structured confirmation e-mail templates;

automatically detecting a received e-mail at the e-mail client residing on the user device, wherein the e-mail is received from one of the plurality of travel itinerary suppliers;

at the user device, automatically extracting confirmation e-mail data from the received e-mail and automatically using the confirmation e-mail data extracted from the e-mail to identify: (a) a supplier of the received e-mail, and (b) the structured confirmation e-mail template corresponding to the supplier of the received e-mail using the template mapping data received from the remote server and stored at the user device;

at the user device, automatically using the confirmation e-mail data extracted from the received e-mail to determine the conformance of the received e-mail to the identified structured confirmation e-mail template;

at the user device, automatically causing a user interface to be displayed in response to a determination that the received e-mail conforms to the identified structured confirmation e-mail template, the user interface prompting the user for feedback regarding whether or not to forward the e-mail to the travel itinerary application of the remote server, wherein the user device forwards the e-mail to the remote server in response to positive user feedback;

receiving the e-mail at the remote server and using the travel itinerary application on the remote server to populate an itinerary item using contents of the received e-mail; and accessing, from the user device, the itinerary item populated by the travel itinerary application on the remote server.

2. The method of claim 1, further comprising:
at the remote server, using a plurality of e-mails forwarded from different e-mail clients and user devices to update at least one structured template for sending to user devices.

3. The method of claim 1, further comprising:
at the user device, extracting additional data from the received e-mail according to the identified structured template.

4. The method of claim 1, further comprising:
at the user device, determining whether the identified structured template matches a structured template associated with an application installed on the user device; and
forwarding at least one of the received e-mail and the data extracted from the received e-mail to the application in response to a positive determination.

5. The method of claim 1, further comprising:
at the user device, generating a new e-mail address comprising the data extracted from the received e-mail;
sending a new e-mail from the e-mail client to the new e-mail address at a domain of the remote server; and
at the remote server, parsing the new e-mail address to identify and extract the data previously extracted from the e-mail received at the e-mail client.

6. A system for handling travel confirmation e-mails, the system comprising:
a remote server comprising a processor and data storage;
a user device comprising a processor and data storage;
the remote server comprising a travel itinerary application, wherein the remote server sends template mapping data to the user device, the template mapping data comprising a set of a plurality of travel itinerary suppliers and at least one structured confirmation e-mail template corresponding to each of the plurality of travel itinerary suppliers, wherein each structured confirmation e-mail template characterizes a standard format in which travel confirmation e-mails are provided by the corresponding travel itinerary supplier;

the user device having an e-mail client, the user device receiving the template mapping data from the remote server including the set of travel itinerary suppliers and the structured confirmation e-mail templates, wherein the user device, the remote server and each of the plurality of travel itinerary suppliers are separate devices;

wherein the user device stores the template mapping data including the set of travel itinerary suppliers and the structured confirmation e-mail templates;

wherein the user device detects a received e-mail from one of the plurality of travel itinerary_suppliers at the e-mail client residing on the user device, and the user device automatically extracts confirmation e-mail data from the received e-mail and uses the extracted confirmation e-mail data to identify: (a) a supplier of the received e-mail, and (b) the structured confirmation e-mail template corresponding to the supplier of the received e-mail using the template mapping data received from the remote server and stored at the user device;

wherein the user device uses the extracted confirmation e-mail data to determine the conformance of the received e-mail to the identified structured confirmation e-mail template;

wherein the user device causes a user interface to be displayed in response to a determination that the received e-mail conforms to the identified structured confirmation e-mail template, the user interface prompting the user for feedback regarding whether or not to forward the e-mail to the travel itinerary application of the remote server, wherein the e-mail client forwards the e-mail to the remote server in response to positive user feedback;

wherein the remote server receives the e-mail and uses the travel itinerary application to populate an itinerary item using contents of the received e-mail; and wherein the user device accesses the itinerary item populated by the travel itinerary application on the remote server.

7. The system of claim 6, wherein the remote server is further configured to use a plurality of e-mails forwarded from different e-mail clients and user devices to update at least one structured template for sending to user devices.

8. The system of claim 6, wherein the user device extracts additional data from the received e-mail according to the identified structured template.

9. The system of claim 6, wherein the user device:
determines whether the identified structured template matches a structured template associated with an application installed on the user device; and
forwards at least one of the received e-mail and the data extracted from the received e-mail to the application in response to a positive determination.

10. The system of claim 6, wherein the user device generates a new e-mail address comprising the data extracted from the received e-mail and sends a new e-mail to the new e-mail address at a domain of the remote server; and wherein the remote server parses the new e-mail address to identify and extract the data previously extracted from the e-mail received at the e-mail client.

11. A computerized method for handling travel confirmation e-mails, the method comprising:

receiving, at a user device having an e-mail client, template mapping data from a travel itinerary application of a remote server, the template mapping data comprising a set of a plurality of travel itinerary suppliers and at least one structured confirmation e-mail template corresponding to each of the plurality of travel itinerary suppliers, wherein each structured confirmation e-mail template characterizes a standard format in which travel confirmation e-mails are provided by the corresponding travel itinerary supplier, wherein the user device, the remote server, and each of the plurality of travel itinerary suppliers are separate devices;

storing, at the user device, the template mapping data including the set of travel itinerary suppliers and the structured confirmation e-mail templates;

automatically detecting a received e-mail at the e-mail client residing on the user device, wherein the e-mail is received from one of the plurality of travel itinerary suppliers;

at the user device, automatically extracting confirmation e-mail data from the received e-mail and automatically using the confirmation e-mail data extracted from the received e-mail to identify: (a) a supplier of the received e-mail, and (b) the structured confirmation e-mail template corresponding to the supplier of the received e-mail using the template mapping data received from the remote server and stored at the user device;

at the user device, automatically using the confirmation e-mail data extracted from the received e-mail to determine the conformance of the received e-mail to the identified structured confirmation e-mail template;

at the user device, automatically causing a user interface to be displayed in response to a determination that the received e-mail conforms to the identified structured confirmation e-mail template, the user interface prompting the user for feedback regarding whether or not to forward the e-mail to a travel itinerary application of the remote server, wherein the user device forwards the e-mail to the remote server in response to positive user feedback, wherein the travel itinerary application on the remote server uses contents of the forwarded e-mail to create an itinerary item; and accessing, from the user device, the itinerary item created by the travel itinerary application on the remote server.

* * * * *